Patented Sept. 29, 1925.

1,555,256

UNITED STATES PATENT OFFICE.

EGIDIO ROMANI, OF TURIN, ITALY, ASSIGNOR TO ERNEST SMITH, OF TURIN, ITALY.

PROCESS OF VULCANIZING RUBBER.

No Drawing. Application filed November 28, 1924. Serial No. 752,802.

*To all whom it may concern:*

Be it known that I, EGIDIO ROMANI, a citizen of the Kingdom of Italy, residing at 17, Via Arsenale, Turin, Italy, have invented new and useful Improvements in Processes of Vulcanizing Rubber, of which the following is a specification.

This invention relates to the vulcanization of rubber, and has for its object to accelerate the action of a vulcanizing agent, namely to assist the vulcanizing agent of the native or artificial rubber, by providing that the vulcanizing agent will react at a greater speed, thus shortening the time of rubber heating.

By vulcanized rubber I mean both elastic india-rubber and ebonite or vulcanite.

I have found that if the α-phenilbiguanide

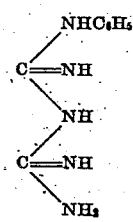

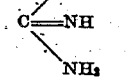

obtained through the well known reaction between the dicyandiamide, the hydrochloride of aniline and caustic soda or potassa, is heated at the atmospheric pressure or under pressure, in aqueous solution with zinc oxide, a compound will be formed which, when well dried, is a white powder, insoluble in cold water and very little soluble in hot water, but soluble in boiling absolute alcohol, the said compound containing zinc molecularly combined and having a much higher melting point than α-phenilbiguanide. Indeed α-phenilbiguanide melts at 294° F., while the new compound melts only at about 374° F. (146° C. and 190° C. respectively).

The analysis of the said compound gives a zinc content of 15.60%. There is therefore a new salt of zinc, namely the zinc-α-phenilbiguanide as per the appended formula, not yet chemically known heretofore:

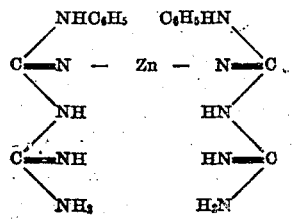

The said compound may also be prepared either by cold or warm precipitation of an aqueous solution of α-phenilbiguanide, or its carbonate or carbamate, with an alkaline or ammonia-zincate, or vice versa, then by drying the glutinous product obtained, or by heating at the atmospheric pressure or under pressure an aqueous solution of α-phenilbiguanide with hydrate of zinc, in the presence or not of caustic soda, potassa or like alkali, and by drying the obtained body. The same compound may also be obtained by heating at ordinary pressure or under pressure an aqueous solution of hydrochloride, or sulphate, or nitrate, or carbonate, or carbamate of α-phenilbiguanide with a soluble salt of zinc, hydrochloride of zinc for instance, in the presence of an excess of caustic soda or potassa, then by drying the obtained product.

The amount of zinc by the said reactions must be so determined that by two molecules of α-phenilbiguanide or its salt, one molecule of zincate, or oxide, or hydrate, or soluble salt of zinc will take part in the reaction. By working with less amounts of zinc inferior results will be obtained, and by greater amounts the resulting dry product would be impure because of the zinc oxide, and thereby only partially soluble in boiling absolute alcohol.

As a rule by the aforesaid reactions, aglutinous compound is first formed (in all probability zincate of α-phenilbiguanide) which, by losing water while drying passes to a salt of zinc.

According to the foregoing, the equation giving the best practical results is as follows.

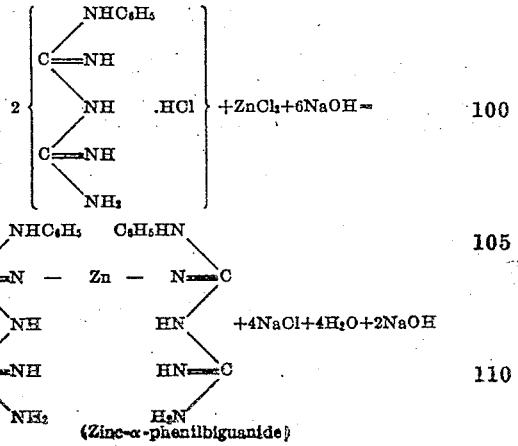

(Zinc-α-phenilbiguanide)

Such a new compound of zinc, which forms the main object of this invention, is an acceleratory body of vulcanization, say a product which will shorten the time required for the said vulcanization. Since such a product appears to be a very rapid one in operation, as a result a relatively little amount thereof may be used in place of any other accelerating agent heretofore known to produce vulcanized rubber of a quality as good as, and even better than, vulcanized rubber obtained by any known accelerating agent.

The action of the said new zinc compound begins at a temperature higher than usual when preparing mixtures of rubber: thereby the risk that the vulcanization of rubber begins during operation is avoided. As compared with α-phenilbiguanide, this new salt of zinc has the advantage that it is insoluble in cold water and very little in hot water, though its accelerating power is not reduced at all, so that its purification is very easy and convenient; it is very stable in the atmosphere and it is not affected like the biguanide mono-substitutes by the action of carbonic acid, it decomposes at a much higher temperature than α-phenilbiguanide, and thence its greater stability.

As regards economy, there is also some advantage because the increase in use of zinc-chloride or a little excess of caustic soda, as compared with the preparation of α-phenilbiguanide, is largely compensated by the greater output in weight of the new compound.

Finally, over all of the substituted biguanides known, this new salt of zinc has the advantage of exerting an accelerating action considerably more efficient—by equal weights of sulphur and any other ingredients—when operating with no zinc-oxide. This happens because this new compound, as shown in the foregoing, already contains combined zinc in the molecule.

The following examples of vulcanization are given:

*Example a.*

86 parts of smoked-sheet, 10 parts of zinc-oxide, 2 parts of sulphur and 2 parts of zinc-α-phenilbiguanide, accurately mixed and vulcanized in a steam press or auto-clave at about 45 pounds per square inch give a product perfectly vulcanized in 20′ minutes.

*Example b.*

86 parts of smoked-sheet, 10 parts of zinc-oxide, 7 parts of sulphur and 3 parts of zinc-α-phenilbiguanide accurately mixed and vulcanized in the same conditions as under *a* gives a product perfectly vulcanized in 5′ minutes.

*Example c.*

90 parts of smoked-sheet, 8 parts of sulphur and 2 parts of zinc-α-phenilbiguanide in the same conditions as under *a* give a product perfectly vulcanized in 25′ minutes.

*Example d.*

60 parts of smoked-sheet, 6 parts of zinc-oxide, 30 parts of sulphur and 4 parts of zinc-α-phenilbiguanide, in the aforesaid conditions, give a perfect ebonite in one and a half hours.

I have meant sulphur as a vulcanizing agent and zinc as a mineral charge, but both may be replaced by any other ingredient having generally like characteristics I therefore do not intend to limit myself to protect the use of zince-α-phenilbiguanide as shown by the foregoing examples, but I desire to secure by Letters Patent its use in the vulcanization of rubber in a more extended and general sense, whatever the ingredients entering the vulcanized mixtures may be.

What I claim is:

1. The process of vulcanizing rubber, which consists in incorporating with a mixture of rubber the zinc-α-phenilbiguanide as accelerating agent, a vulcanizing agent, and vulcanizing the mixture.

2. The process of vulcanizing rubber, which consists in incorporating with rubber, a compounding ingredient, a vulcanizing agent and the zinc-α-phenilbiguanide, and vulcanizing the mixture.

3. A vulcanized body obtained by the reaction of rubber with a vulcanizing agent and the zinc-α-phenilbiguanide.

4. A vulcanized body obtained by the reaction of rubber mixed with a compounding ingredient, a vulcanizing agent and the compound zinc-α-phenilbiguanide.

In witness whereof, I have hereunto signed my name.

EGIDIO ROMANI.